(12) United States Patent
Li et al.

(10) Patent No.: US 11,151,179 B2
(45) Date of Patent: Oct. 19, 2021

(54) METHOD, APPARATUS AND ELECTRONIC DEVICE FOR DETERMINING KNOWLEDGE SAMPLE DATA SET

(71) Applicant: BEIJING BAIDU NETCOM SCIENCE TECHNOLOGY CO., LTD., Beijing (CN)

(72) Inventors: Shuangjie Li, Beijing (CN); Yabing Shi, Beijing (CN); Haijin Liang, Beijing (CN); Yang Zhang, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 16/362,584

(22) Filed: Mar. 22, 2019

(65) Prior Publication Data

US 2020/0004766 A1    Jan. 2, 2020

(30) Foreign Application Priority Data

Jun. 29, 2018   (CN) .......................... 201810713344.5

(51) Int. Cl.
*G06F 16/335* (2019.01)

(52) U.S. Cl.
CPC ................... *G06F 16/335* (2019.01)

(58) Field of Classification Search
CPC .. G06F 16/335; G06F 16/248; G06F 16/9535; G06F 16/951; G06F 16/24575

(Continued)

(56) References Cited

U.S. PATENT DOCUMENTS

| 10,002,129 | B1* | 6/2018 | D'Souza | G06F 40/289 |
| 2012/0197884 | A1* | 8/2012 | Duan | G06F 11/3684 |
| | | | | 707/736 |

(Continued)

FOREIGN PATENT DOCUMENTS

| CN | 104133848 A | 11/2014 |
| CN | 105912656 A | 8/2016 |

(Continued)

OTHER PUBLICATIONS

Sousan, William L. et al., "Using Term Extraction Patterns to Discover Coherent Relationships from Open Source Intelligence" 2010 IEEE International Conference on Social Computing / IEEE International Conference on Privacy, Security, Risk, and Trust; pp. 96.7-972.

(Continued)

*Primary Examiner* — Hosain T Alam
*Assistant Examiner* — Nicholas E Allen
(74) *Attorney, Agent, or Firm* — J.C. Patents

(57) ABSTRACT

Provided are a method, an apparatus and an electronic device for determining a knowledge sample data set, the method includes: acquiring a preset number of SPO triplet formats and source texts; acquiring, according to the SPO triplet formats, n SPO entries corresponding to the SPO triplet formats; searching, in the source texts, m first texts that match the n SPO entries, and generating a first knowledge sample data set; determining k second texts that meet the SPO triplet formats from the m first texts and generating a second knowledge sample data set; generating a target knowledge sample data set according to the first knowledge sample data set and the second knowledge sample data set. In the embodiments, the knowledge sample data set is automatically generated, the volume generation speed is (Continued)

fast, the cost is low, and the data size that can be produced is large, thus meeting the training requirement.

15 Claims, 8 Drawing Sheets

(58) Field of Classification Search
USPC .................................................. 707/827
See application file for complete search history.

(56) References Cited

U.S. PATENT DOCUMENTS

| | | | |
|---|---|---|---|
| 2013/0173604 A1* | 7/2013 | Li ..................... G06F 16/3346 707/723 |
| 2013/0238667 A1* | 9/2013 | Carvalho ............... G06F 16/27 707/798 |
| 2014/0019385 A1* | 1/2014 | Dawson ............... G06F 16/367 706/10 |
| 2016/0132572 A1* | 5/2016 | Chang ................. G06F 16/116 707/723 |
| 2016/0224637 A1 | 8/2016 | Sukumar et al. |
| 2016/0224893 A1* | 8/2016 | Parker, Jr. .............. G06N 5/02 |
| 2017/0046425 A1* | 2/2017 | Tonkin ................. G06F 40/247 |
| 2017/0052995 A1* | 2/2017 | Wang ................... G06F 40/295 |
| 2017/0068748 A1* | 3/2017 | Hu ..................... G06F 16/9017 |
| 2017/0083547 A1* | 3/2017 | Tonkin ................... G06F 16/23 |
| 2017/0124193 A1* | 5/2017 | Li ........................ H04L 63/101 |
| 2017/0132329 A1* | 5/2017 | Yakout ................ G06F 16/9024 |
| 2017/0147635 A1* | 5/2017 | McAteer ............. G06F 16/2246 |
| 2017/0161311 A1* | 6/2017 | Clark .................. G06F 16/9024 |
| 2017/0228372 A1* | 8/2017 | Moreno ............. G06F 16/3329 |
| 2017/0293611 A1* | 10/2017 | Tu ........................ G06F 3/0482 |
| 2017/0337268 A1* | 11/2017 | Ait-Mokhtar ......... G06F 16/367 |
| 2018/0039695 A1* | 2/2018 | Chalabi .................. G06N 5/022 |
| 2018/0247221 A1* | 8/2018 | Park ....................... G06N 20/00 |
| 2018/0267950 A1* | 9/2018 | de Mello Brandao ...................... G06F 3/0481 |
| 2018/0300310 A1* | 10/2018 | Shinn ................... G06N 3/0454 |
| 2018/0314942 A1* | 11/2018 | Shinn ...................... G06N 3/08 |
| 2019/0018904 A1* | 1/2019 | Russell ............. G06F 16/24578 |

FOREIGN PATENT DOCUMENTS

| | | |
|---|---|---|
| CN | 106156365 A | 11/2016 |
| CN | 107729497 A | 2/2018 |
| EP | 3 133 504 A2 | 2/2017 |
| WO | 2014/000764 A1 | 1/2014 |

OTHER PUBLICATIONS

The extended European Search Report of corresponding European application No. 19 16 7135, dated Sep. 30, 2019.
The Chinese First Examination Report of corresponding Chinese application No. 201810713344.5, dated Jun. 25, 2019.

* cited by examiner

METHOD, APPARATUS AND ELECTRONIC DEVICE FOR DETERMINING KNOWLEDGE SAMPLE DATA SET

CROSS-REFERENCE TO RELATED APPLICATIONS

This application claims priority to Chinese Patent Application No. 201810713344.5, filed on Jun. 29, 2018, which is hereby incorporated by reference in its entirety.

TECHNICAL FIELD

Embodiments of the present disclosure relate to the field of data processing technologies, and in particular, to a method, an apparatus, and an electronic device for determining a knowledge sample data set.

BACKGROUND

Knowledge mapping refers to a semantic network with entities and concepts as nodes and semantic relations as edges. Knowledge mapping makes knowledge acquisition more direct, so it can provide semantically related knowledge for reading, thus making reading convenient, intelligent and humanized. The SPO triplet is a key component of the knowledge mapping. The SPO triplet is an entity relationship and an entity attribute. From the perspective of knowledge mapping construction, the entity attribute can enrich entity information in the knowledge mapping, and the entity relationship can enrich the edge relationship of the knowledge mapping, enhance the connectivity of the knowledge mapping.

When constructing the knowledge mapping, it is necessary to train and verify an algorithm of a knowledge extraction task corresponding to the knowledge mapping, at this time, the knowledge sample data set needs to be obtained. The existing method is purely manual labeling by means of crowdsourcing, specifically, the crowdsourcing user is required to list all the SPO triplets in a given natural language text that meet the cognition.

However, in the crowdsourcing labeling method, the big difficulty in labeling, the low labeling speed for the crowdsourcing user, and the high cost of the labeling labor, rendering the produced data size small, which thereby cannot meet training needs of deep learning models commonly used in the current academic circles and the industry.

SUMMARY

Embodiments of the present disclosure provide a method, an apparatus, and an electronic device for determining a knowledge sample data set.

In a first aspect, embodiments of the present disclosure provide a method for determining knowledge sample data set, including:

acquiring a preset number of subject-predicate-object (SPO) triplet formats and source texts;

acquiring, according to the SPO triplet formats, n SPO entries corresponding to the SPO triplet formats;

searching, in the source texts, m first texts that match the n SPO entries, and generating a first knowledge sample data set, wherein each sample in the first knowledge sample data set includes a four-tuple composed of S, P, O and a first text;

determining k second texts that meet the SPO triplet formats from the m first texts, and generating a second knowledge sample data set, wherein each sample in the second knowledge sample data set includes a four-tuple composed of S, P, O, and a second text;

generating a target knowledge sample data set according to the first knowledge sample data set and the second knowledge sample data set.

In a possible implementation of the first aspect, before the generating a target knowledge sample data set according to the first knowledge sample data set and the second knowledge sample data set, the method further includes:

taking samples with the same P, and with the same S or the same O in the first knowledge sample data set and the second knowledge sample data set as a group of samples;

acquiring parallel words of elements with different element values in each group of samples;

supplementing the parallel words to an SPO triplet of the corresponding group of samples, and generating a third knowledge sample data set;

where the generating a target knowledge sample data set according to the first knowledge sample data set and the second knowledge sample data set includes:

generating the target knowledge sample data set according to the first knowledge sample data set, the second knowledge sample data set, and the third knowledge sample data set.

In a possible implementation of the first aspect, before the searching, in the source texts, m first texts that match the n SPO entries, the method includes:

for each source file, dividing the source text, and generating a first candidate sentence text set;

performing a filtering process on the first candidate sentence text set, and generating a second candidate sentence text set;

where the searching, in the source texts, m first texts that match the n SPO entries includes:

for each source file, searching, in the second candidate sentence text set, a first text that matches the n SPO entries.

In a possible implementation of the first aspect, the performing a filtering process on the first candidate sentence text set, and generating a second candidate sentence text set includes:

filtering first candidate sentence texts whose lengths satisfy a preset range in the first candidate sentence text set, and generating the second candidate sentence text set.

In a possible implementation of the first aspect, after the generating a target knowledge sample data set, the method further includes:

performing a right-or-wrong check on each sample in the target knowledge sample data set, and deleting a wrong sample from the target knowledge sample data set.

In a possible implementation of the first aspect, the performing a right-or-wrong check on each sample in the target knowledge sample data set includes:

converting each sample in the target knowledge sample data set into a preset format, and performing a right-or-wrong check on each sample in the target knowledge sample data set in the preset format, and deleting a wrong sample from the target knowledge sample data set.

In a second aspect, embodiments of the present disclosure provide an apparatus for determining a knowledge sample data set, including:

a first acquiring module, configured to acquire a preset number of subject-predicate-object (SPO) triplet formats and source texts;

a second acquiring module, configured to acquire, according to the SPO triplet formats, n SPO entries corresponding to the SPO triplet formats;

a first generating module, configured to search, in the source texts, m first texts that match the n SPO entries, and generate a first knowledge sample data set, where each sample in the first knowledge sample data set includes a four-tuple composed of S, P, O and a first text;

a second generating module, configured to determine k second texts that meet the SPO triplet formats from the m first texts and generate a second knowledge sample data set, where each sample in the second knowledge sample data set includes a four-tuple composed of S, P, O, and a second text;

a third generating module, configured to generate a target knowledge sample data set according to the first knowledge sample data set and the second knowledge sample data set.

In a possible implementation of the second aspect, the apparatus further includes:

a first determining module, configured to take samples with the same P, and with the same S or the same O in the first knowledge sample data set and the second knowledge sample data set as a group of samples;

a third acquiring module, configured to acquire parallel words of elements with different element values in each group of samples;

a fourth generating module, configured to supplement the parallel words to an SPO triplet of the corresponding group of samples and generate a third knowledge sample data set;

the third generating module is specifically configured to generate the target knowledge sample data set according to the first knowledge sample data set, the second knowledge sample data set, and the third knowledge sample data set.

In another possible implementation of the second aspect, the apparatus includes:

a dividing module, configured to divide the source text for each source file and generate a first candidate sentence text set;

a filtering module, configured to perform a filtering process on the first candidate sentence text set and generate a second candidate sentence text set;

the first generating module is specifically configured to for each source file, search, in the second candidate sentence text set, a first text that matches the n SPO entries.

In another possible implementation of the second aspect, the filtering module is specifically configured to filter first candidate sentence texts whose lengths satisfy a preset range in the first candidate sentence text set and generate the second candidate sentence text set.

In another possible implementation of the second aspect, the apparatus further includes:

a checking module configured to perform a right-or-wrong check on each sample in the target knowledge sample data set, and delete a wrong sample from the target knowledge sample data set.

In a third aspect, embodiments of the present disclosure provide an electronic device, including:

a memory, configured to store a computer program;

a processor, configured to execute the computer program to implement the method for determining a knowledge sample data set according to the first aspect.

In a fourth aspect, embodiments of the present disclosure provide a non-volatile computer storage medium, the non-volatile computer storage medium stores a computer program, where the computer program is configured to execute the method for determining a knowledge sample data set according to the first aspect.

The method, apparatus, and electronic device for determining the knowledge sample data set provided by the embodiments of the present disclosure generate a first knowledge sample data set by acquiring a preset number of subject-predicate-object SPO triplet formats and source texts, acquiring n SPO entries corresponding to the SPO triplet formats according to the SPO triplet formats, and searching for m first texts that match the n SPO entries in the source texts, where each sample in the first knowledge sample data set includes a four-tuple composed of S, P, O, and a first text; generate a second knowledge sample data set by determining k second texts corresponding to the SPO triplet formats from the m first texts, where each sample in the second knowledge sample data set includes a four-tuple composed of S, P, O, and a second text; and generate a target knowledge sample data set according to the first knowledge sample data set and the second knowledge sample data set. That is to say, in the embodiments, the knowledge sample data set is automatically generated, the volume generation speed is fast, the cost is low, and the data size that can be produced is large, thus meeting the training requirement.

BRIEF DESCRIPTION OF THE DRAWINGS

In order to more clearly illustrate the embodiments of the present disclosure or the technical solutions in the prior art, the drawings used in the embodiments or the prior art description will be briefly described below. Obviously, the drawings in the following description are some embodiments of the present disclosure, and other drawings can be obtained according to these drawings by those skilled in the art without any inventive labor.

DETAILED DESCRIPTION OF THE EMBODIMENTS

In order to make the objective, technical scheme and advantage of the present disclosure more clear, the technical solutions in the embodiments of the present disclosure will be clearly and completely described in the following with reference to the accompanying drawings in the embodiments of the present disclosure. It is obvious that the described embodiments are only a part of embodiments of the present disclosure, not all embodiments of the present disclosure. Based on the embodiments of the present disclosure, all the other embodiments obtained by those skilled in the art without any creative works are within the protection scope of the present disclosure.

SPO (Subject-Predicate-Object) triplet data refers to a triplet composed of an entity S, a relationship P, an entity O, or an entity S, an attribute P, and an attribute value O, where S is the subject of P, O is the object of P. Schema, refers to the relationship/attribute P, and a type of the subject (S) of P and a type of the object (O) of P.

Each sample in a knowledge sample data set can be represented as a (S-P-O-text) four-tuple.

The existing technology generates a knowledge sample data set by means of crowdsourcing labeling, the big difficulty in labeling, the low labeling speed, and the high cost of the labeling labor, rendering the produced data size small, which thereby cannot meet training needs.

In order to solve the above technical problem, the technical solution provided by embodiments of the present disclosure generate a first knowledge sample data set by acquiring a preset number of SPO triplet formats and source texts, acquiring n SPO entries corresponding to the SPO triplet formats according to the SPO triplet formats, and searching for first texts that match the SPO entries in the source texts; generates a second knowledge sample data set by determining second texts corresponding to the SPO triplet formats from the first texts and generates a target knowledge sample data set according to the first knowledge sample data set and the second knowledge sample data set, therefore, the knowledge sample data set is automatically generated, the volume generation speed is fast, the cost is low, and the data size that can be produced is large, thus meeting the training requirement.

The technical solution of the present disclosure will be described in detail below with specific embodiments. The following specific embodiments may be combined with each other, and the same or similar concepts or processes may not be described in some embodiments.

Figure 1:
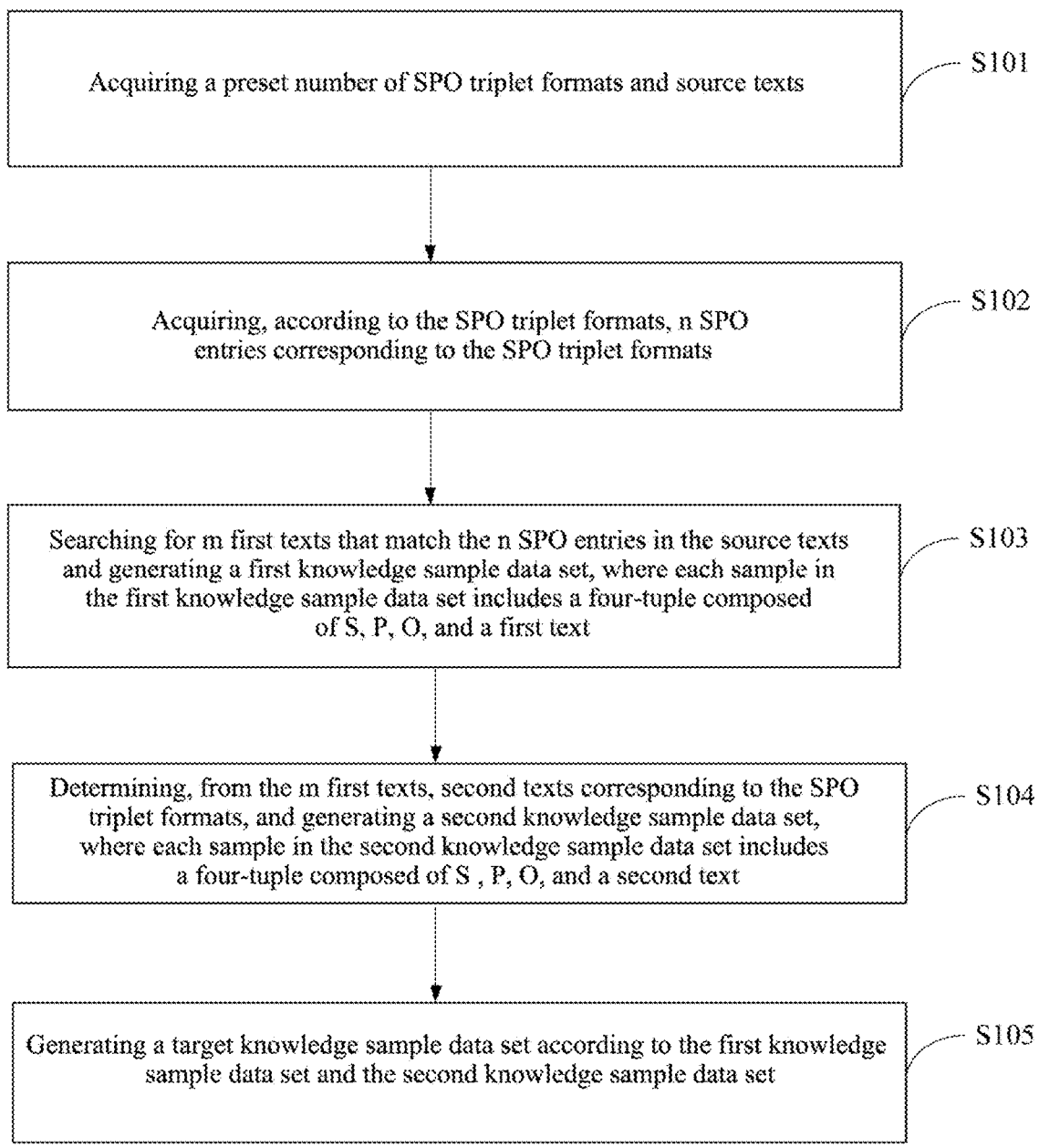
FIG. 1 is a schematic flowchart of a method for determining a knowledge sample data set according to Embodiment 1 of the present disclosure.

FIG. 1 is a schematic flowchart diagram of a method for determining a knowledge sample data set according to Embodiment 1 of the present disclosure. As shown in FIG. 1, the method in the embodiment may include:

S101: acquiring a preset number of SPO triplet formats and source texts.

The executive subject matter of the embodiment may be a determining apparatus of a knowledge sample data set having a function of determining the knowledge sample data set. The determining apparatus of the knowledge sample data set of the embodiment may be a part of an electronic device, such as a processor of the electronic device. Optionally, the determining apparatus of the knowledge sample data set in the embodiment may also be a separate electronic device.

The electronic device of the embodiment may be an electronic device such as a smart phone, a desktop computer, a notebook computer or a smart bracelet.

The embodiment is described by taking that the executive subject matter is an electronic device as an example.

Knowledge extraction under the Schema constraint means that, given a Schema set, extracting entity relationship data and entity attribute data, that is, an SPO triplet in accordance with Schema requirements in a free text.

The entity relationship and the entity attribute are key components of knowledge mapping. From the perspective of knowledge mapping construction, the entity attribute can enrich entity information in the knowledge mapping, the entity relationship can enrich an edge relationship in the knowledge mapping and improve the connectivity of the knowledge mapping.

Figure 2:
FIG. 2 is a schematic diagram of a search according to Embodiment 1 of the present disclosure.
Figure 3:
FIG. 3 is a schematic diagram of recommendations according to Embodiment 1 of the present disclosure.

From the perspective of product application, the entity relationship and the entity attribute, on the one hand, can directly satisfy the user's search requirements in terms of knowledge. For example, as shown in FIG. 2, when searching for "Andy Lau's height", the answer can be directly given through the entity relationship and the entity attribute data. On the other hand, the related knowledge can be recommended to the user based on the entity relationship, and reading experience with extended information can be provided to the user. For example, as shown in FIG. 3, when searching for "Faye Wong", the other entities related to Faye Wong can be recommended to the user through the entity relationship.

It can be seen that to achieve the accuracy of the search and recommendation, the algorithm of the knowledge extraction task needs to be trained, verified, and etc. However, in the existing technology for obtaining a knowledge sample data set, the big difficulty in labeling, the low labeling speed, and the high cost of the labeling labor, rendering the produced data size small, which thereby cannot meet training needs.

Therefore, in order to solve the above technical problem, the present embodiment uses the knowledge extraction data set under the Schema constraint.

Specifically, according to the principle that the amount of knowledge covering the SPO is sufficient and the user demand is sufficiently high, a certain number of P sets are delineated in the knowledge base, and a category S and a category O corresponding to each P are labeled, where the category S covers some common entity concepts such as a character, an organization, a region, etc. In addition to the entity concepts, the category O also encompasses some basic data categories, such as a date, a number, a text, and so on.

The SPO triplet formats of the embodiment may be: a character, a couple, a character; a movie, a starring, a character; a country, an area, a number, and the like.

According to the above manner, a preset number of SPO triplet formats can be determined.

At the same time, the source texts are acquired, for example, from Baidu baike or a news body, etc., to obtain a plurality of source texts.

S102: acquiring, according to the SPO triplet formats, n SPO entries corresponding to the SPO triplet formats.

Specifically, according to the foregoing steps, acquiring a preset number of SPO triplet formats, and acquiring n SPO entries satisfying the SPO triplet formats from the existing knowledge base.

For example, the SPO triplet format is a country, an area, a value, so that the SPO entries that satisfy the SPO triplet format can be acquired from an existing knowledge base. For example, it can be acquired that the area of China is 9.6 million square kilometers.

According to the above method, n SPO entries corresponding to the SPO triplet formats can be acquired.

S103: searching for m first texts that match the n SPO entries in the source texts and generating a first knowledge sample data set, where each sample in the first knowledge sample data set includes a four-tuple composed of S, P, O, and a first text.

Specifically, according to the above steps, the source texts and n SPO entries can be acquired, and m first texts matching the SPO entries are searched in the source texts.

For example, by using multi-mode matching, searching for the first texts matching the SPO entries in the source texts. In the matching process, S and O are matched, and the matching process relies on the following two hypotheses: the first hypothesis is that for a pair of S and O, there may be only one relationship/attribute between them, and when they appear together in the text, consider it as default that the text describes the relationship/attribute.

For example, in Text 1, if S and O in the first SPO entry appear, Text 1 is considered to match the first SPO entry, and a knowledge sample is generated as (S-P-O-text 1).

Referring to the above manner, searching for m first texts matching the n SPO entries in the source texts, and generating a first knowledge sample data set.

Where each sample in the first knowledge sample data set includes a four-tuple composed of S, P, O and a first text.

Optionally, performing fuzzy matching on O of the type date, time, location, and performing accurate matching of names or aliases on S and O of other types.

Optionally, in a possible implementation of the embodiment, before searching for the first text that matches the SPO entries in the source texts, the method includes:

S102a: for each source file, dividing the source text and generating a first candidate sentence text set.

Specifically, according to the punctuation marks, dividing the source text into sentence granularities, and generating the first candidate sentence text set.

S102b: performing filtering process on the first candidate sentence text set and generating a second candidate sentence text set.

For example, filtering first candidate sentence texts whose lengths meet a preset range in the first candidate sentence text set and generating the second candidate sentence text set.

That is, filtering out the sentences that are too short and too long in the first candidate sentence text set.

Optionally, deleting meaningless sentences, such as deleting punctuation masks or modal words.

S102c: searching, for each source file, a first text that matches the n SPO entries in the second candidate sentence text set.

Specifically, matching each second candidate sentence in the second candidate sentence text set with each SPO entry, and using the matched second candidate sentence as the first text.

S104: determining, from the m first texts, second texts corresponding to the SPO triplet formats, and generating a second knowledge sample data set, where each sample in the second knowledge sample data set includes a four-tuple composed of S, P, O, and a second text.

In the embodiment, according to the above steps, the source texts are filtered, and m first texts that match the n SPO entries are reserved.

In the embodiment, since the first knowledge sample data set is generated based on the first SPO entry, and the first SPO entry is generated based on the existing knowledge base, the existing knowledge base includes limited data, thereby rendering the first knowledge sample data set less comprehensive.

In order to solve this problem, in the embodiment, it is necessary to re-filter the texts in the first text that satisfy the SPO triplet formats.

Specifically, determining second texts that meet the SPO triplet format from the m first texts.

For example, the SPO triplet format is movie, starring, character. According to the above steps, the generated SPO entry may be that the starring of the movie A is the character B, but the starring of the movie A is not one person, the data in the first knowledge sample data set generated by the SPO entry may be incomplete.

Therefore, the second text corresponding to the SPO triplet format is acquired from the above m first texts, for example, the acquired second text 1 is that the starring of the movie A is character C, so that a knowledge sample can be determined as (the movie A, the starring, the character C, the second text 1).

According to this step, k second texts corresponding to the SPO triplet formats are determined from the m first texts, and respective SPOs are extracted from the k second texts, and a second knowledge sample data set is generated. Each sample in the second knowledge sample data set includes a four-tuple composed of S, P, O, and a second text.

The second knowledge sample data set of the embodiment is determined according to the SPO triplet formats, which can determine samples that are not included in the first knowledge sample data set, thereby complementing the knowledge sample data set.

S105: generating a target knowledge sample data set according to the first knowledge sample data set and the second knowledge sample data set.

Specifically, some of the samples in the acquired first knowledge sample data set and the second knowledge sample data set may be the same or different, which is not limited in the embodiment, as long as the samples in the first knowledge sample data set and the second knowledge are in accordance with the SPO triplet formats.

The first knowledge sample data set and the second knowledge sample data set are complementary, and the samples included in the generated target knowledge sample data set are comprehensive, so that the accuracy of training or verification can be improved when using the comprehensive samples for training or verifying the knowledge model or algorithm.

The method for determining a knowledge sample data set provided by embodiments of the present disclosure generates a first knowledge sample data set by acquiring a preset number of subject-predicate-object SPO triplet formats and source texts, acquiring n SPO entries corresponding to the SPO triplet formats according to the SPO triplet formats and searching for m first texts that match the n SPO entries in the source texts, where each sample in the first knowledge sample data set includes a four-tuple composed of S, P, O, and a first text; generates a second knowledge sample data set by determining k second texts corresponding to the SPO triplet formats from the m first texts, where each sample in the second knowledge sample data set includes a four-tuple composed of S, P, O, and a second text; and generates a target knowledge sample data set according to the first knowledge sample data set and the second knowledge sample data set. That is to say, in the embodiment, the knowledge sample data set is automatically generated, the volume generation speed is fast, the cost is low, and the data size that can be produced is large, thus meeting the training requirement.

Figure 4:
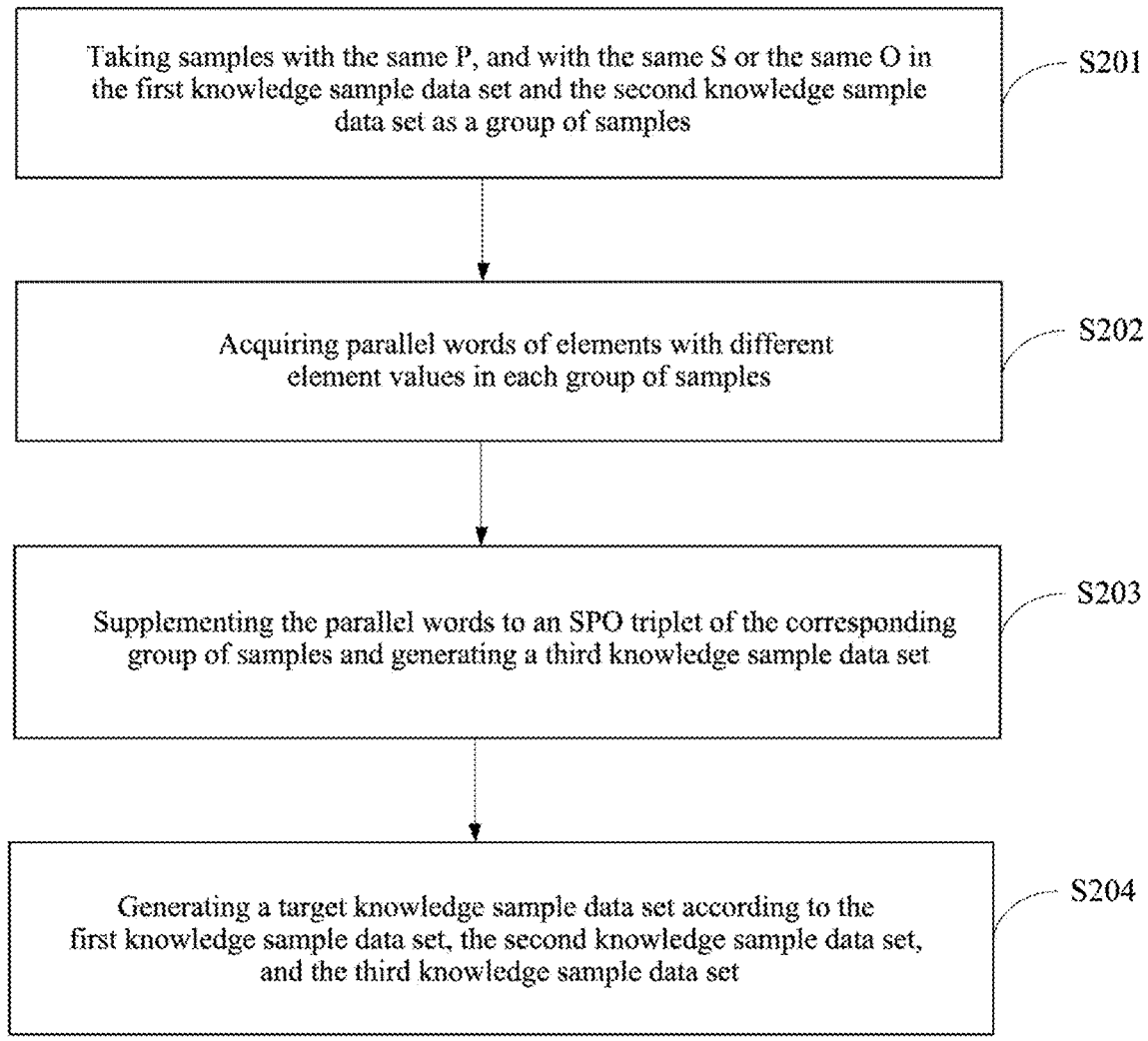
FIG. 4 is a schematic flowchart of a method for determining a knowledge sample data set according to Embodiment 2 of the present disclosure.

FIG. 4 is a flow chart showing an example of a method for determining a knowledge sample data set according to Embodiment 2 of the present disclosure. Based on the foregoing embodiment, the embodiment relates to a specific process for performing parallel expansion on the knowledge sample data set and generating a third knowledge sample data set. As shown in FIG. 4, after the foregoing S105, the method according to the embodiment further includes:

S201: taking samples with the same P, and with the same S or the same O in the first knowledge sample data set and the second knowledge sample data set as a group of samples.

In this step, the S or O in the samples of the generated first knowledge sample data set and the second knowledge sample data set may have a parallel relationship.

In this way, it is necessary to obtain samples with the same P, and with the same S or the same O in the first knowledge sample data set and the second knowledge sample data set, and these samples are recorded as a group of samples, so that different groups of samples can be generated.

For example, Sample 1 in the first knowledge sample data set is that the starring of the movie A is character B, and Sample 2 of the second knowledge sample data set is that the starring of the movie A is character C, it can be seen that character B and character C are parallel words, Sample 1 and Sample 2 are thus recorded as a group of samples.

S202: acquiring parallel words of elements with different element values in each group of samples.

Referring to the above example, for example, Sample 1 is that the starring of the movie A is character B, and Sample 2 of the second knowledge sample data set is that the starring of the movie A is character C, it can be determined that the starring characters of Sample 1 and Sample 2 are different, that is, O is different, so that it can be obtained that Os in Sample 1 and Sample 2 have parallel words, that is, character B and character C are parallel words.

S203: supplementing the parallel words to an SPO triplet of the corresponding group of samples and generating a third knowledge sample data set.

Continuing with the above example, the parallel words character B and character C are supplemented to Sample 1 and/or Sample 2, and a new Sample 3 that the starring of the movie A is character B and the character C is generated, thereby complementing the sample.

According to the above method, samples whose Ss or Os have a parallel relationship can be searched in the first knowledge sample data set and the second knowledge sample data set, and the parallel words of the S or O corresponding to these samples are obtained, the parallel words can be supplemented to the corresponding samples, and a more comprehensive sample of the information is generated. Next, based on these samples with more comprehensive information, a third knowledge sample data set is generated.

In the embodiment, the samples in the third knowledge sample data set include comprehensive information, thereby improving a recall rate for producing samples through a machine algorithm, and further improving the accuracy of the knowledge sample data set.

S204: generating a target knowledge sample data set according to the first knowledge sample data set, the second knowledge sample data set, and the third knowledge sample data set.

In the embodiment, since the first knowledge sample data set is generated based on the existing knowledge base, and the existing knowledge base includes limited data, thus rendering the first knowledge sample data set less comprehensive. The second knowledge sample data set is a supplement to the first knowledge sample data set, and when the first knowledge sample data set and the second knowledge sample data set are generated, the matching may be performed based on an S or an O, for example, a starring of a movie is set to be one person as default, or the character as the starring of the movie recorded in different texts are inconsistent, such that the samples generated by the first knowledge sample data set and the second knowledge sample data set are not comprehensive.

In order to solve the technical problem, in this step, the parallel words of the S or O in the first knowledge sample data set and the second knowledge sample data set are acquired, and the parallel words are supplemented to the corresponding samples, thereby generating a relatively comprehensive third knowledge sample data set.

Then, the target knowledge sample data set is generated according to the first knowledge sample data set, the second knowledge sample data set, and the third knowledge sample data set, for example, the first knowledge sample data set, the second knowledge sample data set, and the third knowledge sample data set are combined to generate a target knowledge sample data set.

Optionally, the repeated samples in the first knowledge sample data set, the second knowledge sample data set and the third knowledge sample data set are deleted, and the target knowledge sample data set is generated.

The data volume of the target knowledge sample data set is comprehensive, thus accurate and comprehensive training of the model can be realized based on the target knowledge sample data set.

The method for determining a knowledge sample data set provided by the embodiment of the present disclosure generates a third knowledge sample data set by taking samples of the first knowledge sample data set and the second knowledge sample data set that have the same P, and have the same S or O as a group of samples, acquiring parallel words of elements having different element values in each group of samples and supplementing the parallel words to an SPO triplet of the corresponding set of samples; and generates a target knowledge sample data set according to the first knowledge sample data set, the second knowledge sample data set and the third knowledge sample data set, thereby further improving the accuracy and comprehensiveness of the target knowledge sample data set.

In a possible implementation of the embodiment, in order to further improve the accuracy of the target knowledge sample data set, after generating the target knowledge sample data set, the method of the embodiment further includes:

S106: performing a right-or-wrong check on each sample in the target knowledge sample data set, and deleting a wrong sample from the target knowledge sample data set.

Specifically, in order to reduce an error rate of the samples in the target knowledge sample data set, the correctness of each sample in the target knowledge sample data set is checked, and the wrong samples are deleted, so as to improve the accuracy of the target knowledge sample data set.

For example, according to the SPO format of each sample in the target knowledge sample data set, the sample that is not in conformity with the SPO format is deleted. For example, the SPO format of the sample is the character, the nationality, the country, but the text of the sample indicates that the nationality of Li Si is an ethnic Chinese, therefore, it can be determined that the sample is wrong and can be deleted.

Optionally, in the embodiment, the correctness of the samples in the target knowledge sample data set can be determined according to other manners, which is not limited in the embodiment.

In an example, the foregoing S106 may be: converting each sample in the target knowledge sample data set into a preset format, and performing a right-or-wrong check on each sample in the target knowledge sample data set in the preset format, deleting a wrong sample from the target knowledge sample data set.

Specifically, in order to facilitate the judgment of the samples, converting the samples into a unified format, i.e., a preset format. The preset format is not limited in the embodiment, and can be determined according to actual needs.

Optionally, the preset format is a judgment sentence. For example, the text included in the sample is: Zhang San (1913-1992), a famous Chinese geographer, the sample is converted into a preset format and turns to be as follows: the nationality of Zhang San is China, or Zhang San is a geographer and other determinative sentences.

Optionally, in the embodiment, when determining the samples in the target knowledge sample data set, the following criteria may be referred to:

1. The SPO triple can conform to the meaning expressed in the sentence, and it is unnecessary to judge whether it is true in reality.

2. If O is an incomplete date/low precision number, etc., as long as it does not conflict with information in the sentence, then it is determined to be correct. For example, according to the sentence "Baidu was established on Jan. 1, 2000", it is determined that: Baidu (company) was established in 2000 (date), which is correct.

3. P in the SPO triplet does not need to appear explicitly in the sentence, as long as the meaning is consistent, it can be determined to be correct. For example, according to the sentence "Cuihua married to Tiezhu", it is determined that the husband of Cuihua (character) is Tiezhu (character), which is correct.

4. If S or O does not match the required type, it is determined to be wrong. For example, the nationality of Li Si (character) is an ethnic Chinese (country), which is wrong because the "ethnic Chinese" is not a country.

In the embodiments of the present disclosure, by checking the correctness of the samples in the target knowledge sample data set, the accuracy of the samples is improved, and the effect of the final produced samples is ensured.

Figure 5:
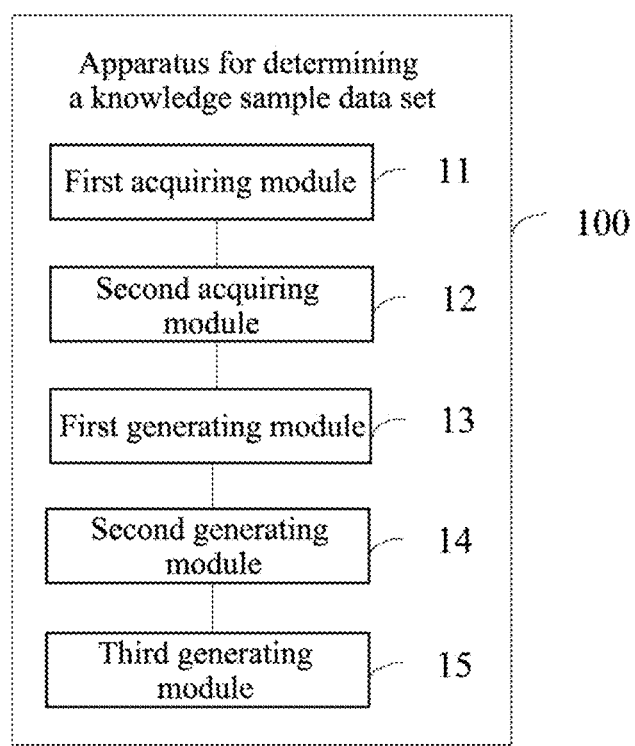
FIG. 5 is a schematic structural diagram of an apparatus for determining a knowledge sample data set according to Embodiment 1 of the present disclosure.

FIG. 5 is a schematic structural diagram of an apparatus for determining a knowledge sample data set according to Embodiment 1 of the present disclosure. As shown in FIG. 5, the apparatus 100 for determining the knowledge sample data set of the embodiment may include:

a first acquiring module 11, configured to acquire a preset number of subject-predicate-object (SPO) triplet formats and source texts;

a second acquiring module 12, configured to acquire, according to the SPO triplet formats, n SPO entries corresponding to the SPO triplet formats;

a first generating module 13, configured to search, in the source texts, m first texts that match the n SPO entries, and generate a first knowledge sample data set, where each sample in the first knowledge sample data set includes a four-tuple composed of S, P, O and a first text;

a second generating module 14, configured to determine k second texts that meet the SPO triplet formats from the m first texts and generate a second knowledge sample data set, where each sample in the second knowledge sample data set includes a four-tuple composed of S, P, O, and a second text;

a third generating module 15, configured to generate a target knowledge sample data set according to the first knowledge sample data set and the second knowledge sample data set.

The device for determining the knowledge sample data set of the embodiment of the present disclosure may be used to perform the technical solutions of the foregoing method embodiments, the implementation principle and the technical effects thereof are similar, and details are not described herein again.

Figure 6:
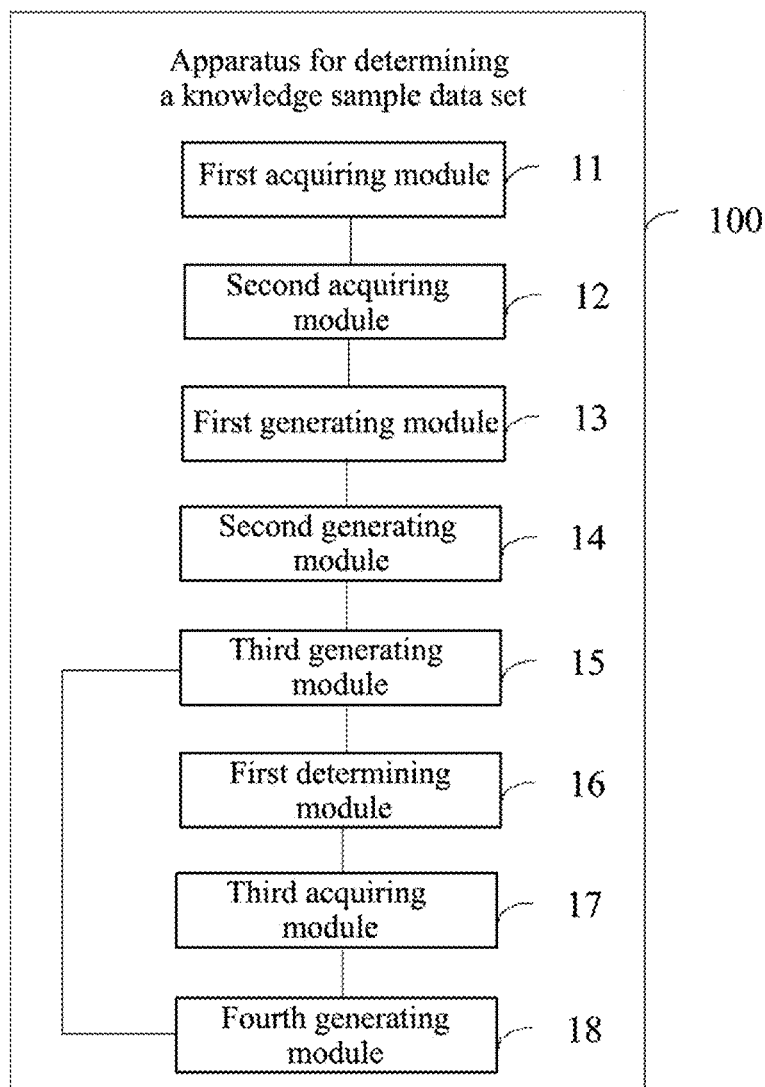
FIG. 6 is a schematic structural diagram of an apparatus for determining a knowledge sample data set according to Embodiment 2 of the present disclosure.

FIG. 6 is a schematic structural diagram of a device for determining a knowledge sample data set according to Embodiment 2 of the present disclosure. As shown in FIG. 6, the apparatus 100 for determining the knowledge sample data set further includes:

a first determining module 16, configured to take samples with the same P, and with the same S or the same O in the first knowledge sample data set and the second knowledge sample data set as a group of samples;

a third acquiring module 17, configured to acquire parallel words of elements with different element values in each group of samples;

a fourth generating module 18, configured to supplement the parallel words to an SPO triplet of the corresponding group of samples and generate a third knowledge sample data set;

the third generating module 15 is specifically configured to generate the target knowledge sample data set according to the first knowledge sample data set, the second knowledge sample data set, and the third knowledge sample data set.

The apparatus for determining the knowledge sample data set of the embodiment of the present disclosure may be used to perform the technical solutions of the foregoing method embodiments, the implementation principle and the technical effects thereof are similar, and details are not described herein again.

Figure 7:
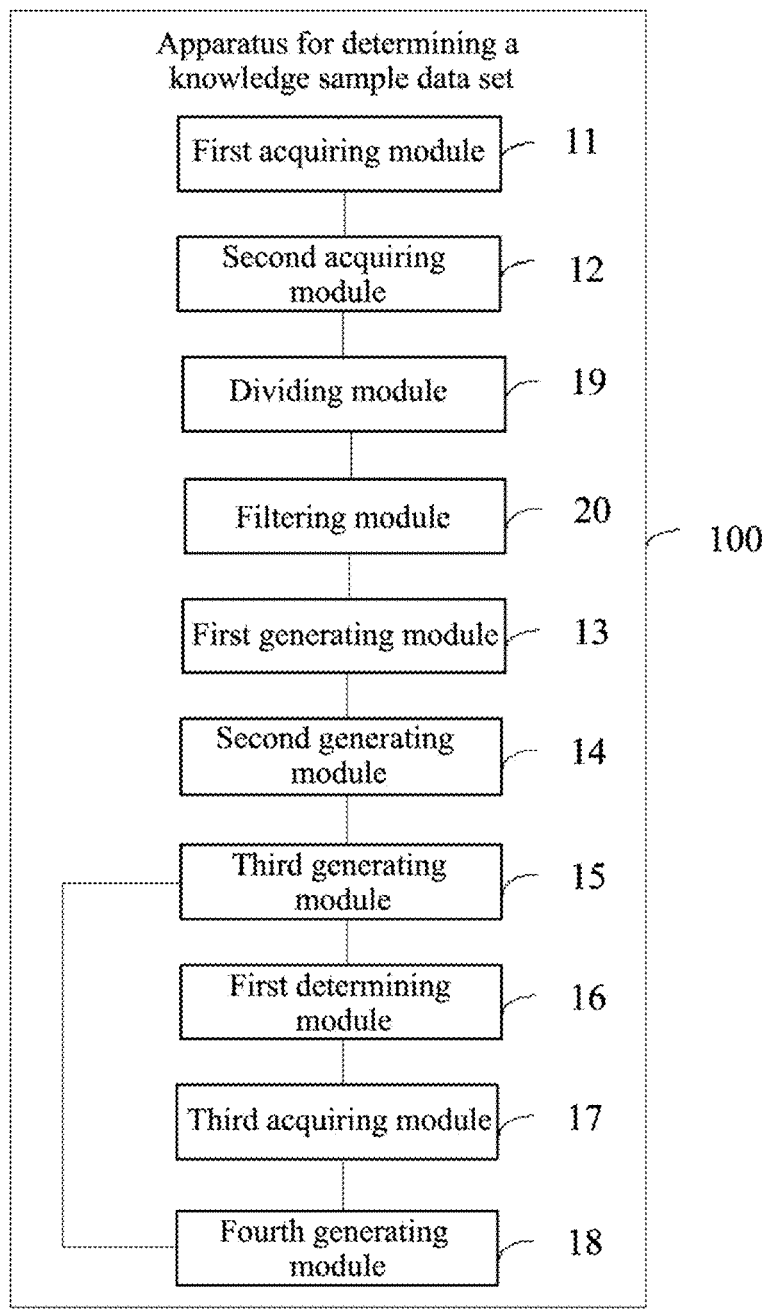
FIG. 7 is a schematic structural diagram of an apparatus for determining a knowledge sample data set according to Embodiment 3 of the present disclosure.

FIG. 7 is a schematic structural diagram of an apparatus for determining a knowledge sample data set according to Embodiment 3 of the present disclosure. Based on the foregoing embodiment, the apparatus 100 for determining the knowledge sample data set further includes:

a dividing module 19, configured to divide the source text for each source file and generate a first candidate sentence text set;

a filtering module 20, configured to perform a filtering process on the first candidate sentence text set and generate a second candidate sentence text set;

the first generating module 13 is specifically configured to for each source file, search, in the second candidate sentence text set, a first text that matches the n SPO entries.

In a possible implementation of the embodiment, the filtering module 20 is specifically configured to filter first candidate sentence texts whose lengths satisfy a preset range in the first candidate sentence text set and generate the second candidate sentence text set.

The apparatus for determining the knowledge sample data set of the embodiment of the present disclosure may be used to perform the technical solutions of the foregoing method embodiments, and the implementation principle and the technical effect thereof are similar, and details are not described herein again.

Figure 8:
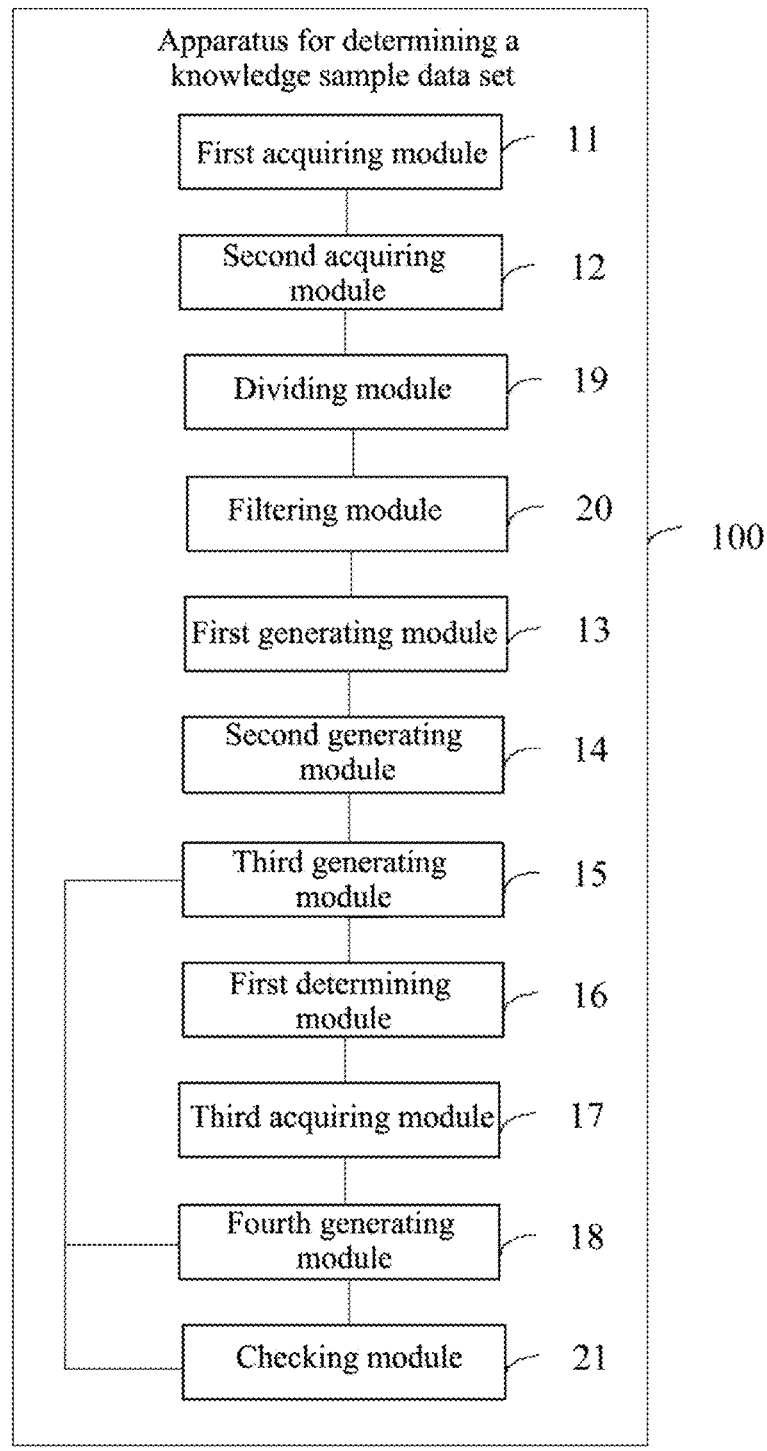
FIG. 8 is a schematic structural diagram of an apparatus for determining a knowledge sample data set according to Embodiment 4 of the present disclosure.

FIG. 8 is a schematic structural diagram of an apparatus for determining a knowledge sample data set according to Embodiment 4 of the present disclosure. Based on the foregoing embodiment, the apparatus 100 for determining the knowledge sample data set further includes:

a checking module 21, configured to perform a right-or-wrong check on each sample in the target knowledge sample data set, and delete a wrong sample from the target knowledge sample data set.

In a possible implementation of the embodiment, the checking module 21 is specifically configured to convert each sample in the target knowledge sample data set into a preset format, and in the preset format, perform a right-or-wrong check on each sample in the target knowledge sample data set, and delete a wrong sample from the target knowledge sample data set.

The apparatus for determining the knowledge sample data set of the embodiment of the present disclosure may be used to perform the technical solutions of the foregoing method embodiments, the implementation principle and the technical effects thereof are similar, and details are not described herein again.

Figure 9:
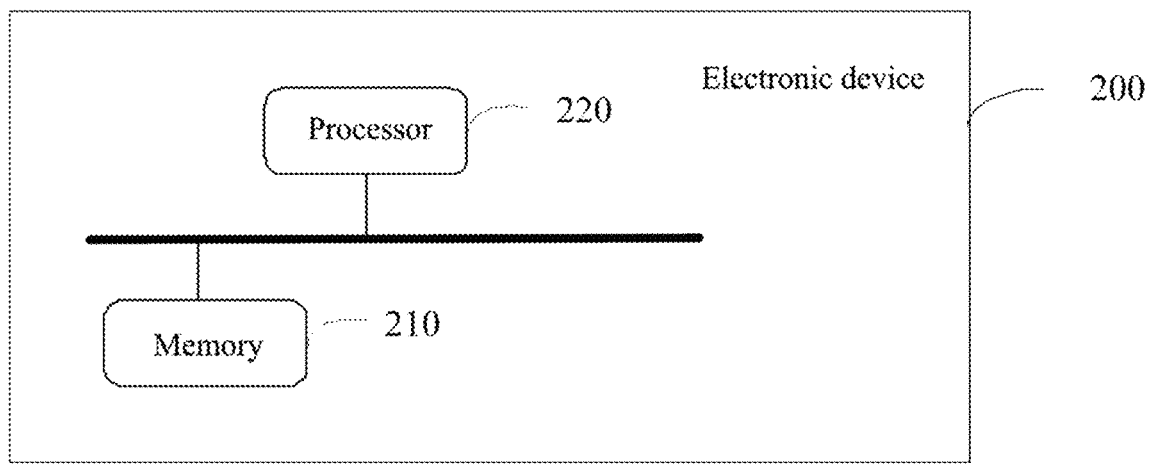
FIG. 9 is a schematic structural diagram of an electronic device according to an embodiment of the present disclosure.

FIG. 9 is a schematic structural diagram of an electronic device according to an embodiment of the present disclosure. As shown in FIG. 9, the electronic device 200 of the embodiment includes:

a memory 220, configured to store a computer program;

a processor 230, configured to execute the computer program to implement the above-mentioned method for determining the knowledge sample data set, the implementation principle and the technical effects are similar, and details are not described herein again.

Further, when at least a part of the function of the method for determining the knowledge sample data set in the embodiments of the present disclosure is implemented by software, the embodiment of the present disclosure further provides a non-volatile computer storage medium, where the non-volatile computer storage medium is used to store computer software instructions for determining the knowledge sample data set, which when executed on the computer, cause the computer to perform various possible methods for determining the knowledge sample data set in the above method embodiments. When the computer executable instructions are loaded and executed on a computer, the processes or functions described in accordance with embodiments of the present disclosure may be generated in whole or in part. The computer instructions may be stored in a non-volatile computer storage medium or transferred from one non-volatile computer storage medium to another non-volatile computer storage medium, which may be wirelessly transferred (e.g., cellular communication, infrared, short-range wireless, microwave, etc.) to another website site, computer, server, or data center. The non-volatile computer storage medium can be any available media that can be accessed by a computer or a data storage device such as a server, data center, or the like that includes one or more available media. The usable medium may be a magnetic medium (e.g., a floppy disk, a hard disk, a magnetic tape), an optical medium (e.g., a DVD), or a semiconductor medium (e.g., an SSD) or the like.

It should be noted that the above embodiments are only used to explain the technical solution of the present disclosure and shall not be construed as limitation to the present disclosure; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not deviate from the range of the technical solutions of the embodiments of the present disclosure.

What is claimed is:

1. A method for determining a knowledge sample data set, comprising:
   acquiring a preset number of subject-predicate-object (SPO) triplet formats and source texts;
   acquiring, according to the SPO triplet formats, n SPO entries corresponding to the SPO triplet formats;
   filtering the source texts to determine m first texts that match the n SPO entries, and generating a first knowledge sample data set, wherein each sample in the first knowledge sample data set comprises a four-tuple composed of S, P, O and a first text;
   re-filtering the m first texts to determine k second texts that meet the SPO triplet formats from the m first texts, and generating a second knowledge sample data set, wherein each sample in the second knowledge sample data set comprises a four-tuple composed of S, P, O, and a second text; wherein the second knowledge sample data set is a supplementary set of the first knowledge sample data set;
   generating a target knowledge sample data set according to the first knowledge sample data set and the second knowledge sample data set;
   wherein before the generating a target knowledge sample data set according to the first knowledge sample data set and the second knowledge sample data set, the method further comprises:
   taking samples with the same P, and with the same S or the same O in the first knowledge sample data set and the second knowledge sample data set as a group of samples;
   acquiring parallel words of elements with different element values in each group of samples;
   supplementing the parallel words to an SPO triplet of the corresponding group of samples and generating a third knowledge sample data set;
   wherein the generating a target knowledge sample data set according to the first knowledge sample data set and the second knowledge sample data set comprises:
   generating the target knowledge sample data set according to the first knowledge sample data set, the second knowledge sample data set, and the third knowledge sample data set.

2. The method according to claim 1, wherein before the searching, in the source texts, m first texts that match the n SPO entries, the method comprises:
   for each source file, dividing the source text and generating a first candidate sentence text set;
   performing a filtering process on the first candidate sentence text set and generating a second candidate sentence text set;
   wherein the searching, in the source texts, m first texts that match the n SPO entries comprises:
   for each source file, searching, in the second candidate sentence text set, a first text that matches the n SPO entries.

3. The method according to claim 2, wherein the performing a filtering process on the first candidate sentence text set and generating a second candidate sentence text set comprises:
   filtering first candidate sentence texts whose lengths satisfy a preset range in the first candidate sentence text set and generating the second candidate sentence text set.

4. The method according to claim 1, wherein after the generating a target knowledge sample data set, the method further comprises:
   performing a right-or-wrong check on each sample in the target knowledge sample data set, and deleting a wrong sample from the target knowledge sample data set.

5. The method according to claim 4, wherein the performing a right-or-wrong check on each sample in the target knowledge sample data set comprises:
   converting each sample in the target knowledge sample data set into a preset format, and performing a rightor-wrong check on each sample in the target knowledge sample data set in the preset format, and deleting a wrong sample from the target knowledge sample data set.

6. An apparatus for determining a knowledge sample data set, comprising a processor and a memory having executable instructions stored thereon that when executed by the processor cause the processor to:
acquire a preset number of subject-predicate-object (SPO) triplet formats and source texts;
acquire, according to the SPO triplet formats, n SPO entries corresponding to the SPO triplet formats;
filter the source texts to determine m first texts that match then SPO entries, and generate a first knowledge sample data set, wherein each sample in the first knowledge sample data set comprises a four-tuple composed of S, P, O and a first text;
re-filter the m first texts to determine k second texts that meet the SPO triplet formats from the m first texts and generate a second knowledge sample data set, wherein each sample in the second knowledge sample data set comprises a four-tuple composed of S, P, O, and a second text; wherein the second knowledge sample data set is a supplementary set of the first knowledge sample data set;
generate a target knowledge sample data set according to the first knowledge sample data set and the second knowledge sample data set;
wherein the processor is further configured to:
take samples with the same P, and with the same S or the same O in the first knowledge sample data set and the second knowledge sample data set as a group of samples;
acquire parallel words of elements with different element values in each group of samples;
supplement the parallel words to an SPO triplet of the corresponding group of samples and generate a third knowledge sample data set;
generate the target knowledge sample data set according to the first knowledge sample data set, the second knowledge sample data set, and the third knowledge sample data set.

7. The apparatus according to claim 6, wherein the processor is configured to:
divide the source text for each source file and generate a first candidate sentence text set;
perform a filtering process on the first candidate sentence text set and generate a second candidate sentence text set;
for each source file, search, in the second candidate sentence text set, a first text that matches the n SPO entries.

8. The apparatus according to claim 7, wherein:
the processor is configured to filter first candidate sentence texts whose lengths satisfy a preset range in the first candidate sentence text set and generate the second candidate sentence text set.

9. The apparatus according to claim 6, wherein the processor is further configured to:
perform a right-or-wrong check on each sample in the target knowledge sample data set, and delete a wrong sample from the target knowledge sample data set.

10. The apparatus according to claim 9, wherein:
the processor is configured to convert each sample in the target knowledge sample data set into a preset format, and perform a right-or-wrong check on each sample in the target knowledge sample data set in the preset format and delete a wrong sample from the target knowledge sample data set.

11. A non-volatile computer storage medium, wherein the non-volatile storage medium stores a computer program, the computer program, when executed, implements:
acquiring a preset number of subject-predicate-object (SPO) triplet formats and source texts;
acquiring, according to the SPO triplet formats, n SPO entries corresponding to the SPO triplet formats;
filtering the source texts to determine m first texts that match the n SPO entries, and generating a first knowledge sample data set, wherein each sample in the first knowledge sample data set comprises a four-tuple composed of S, P, O and a first text;
re-filtering the m first texts to determine k second texts that meet the SPO triplet formats from the m first texts, and generating a second knowledge sample data set, wherein each sample in the second knowledge sample data set comprises a four-tuple composed of S, P, O, and a second text; wherein the second knowledge sample data set is a supplementary set of the first knowledge sample data set;
generating a target knowledge sample data set according to the first knowledge sample data set and the second knowledge sample data set;
wherein the computer program, when executed, further implements:
taking samples with the same P, and with the same S or the same O in the first knowledge sample data set and the second knowledge sample data set as a group of samples;
acquiring parallel words of elements with different element values in each group of samples;
supplementing the parallel words to an SPO triplet of the corresponding group of samples and generating a third knowledge sample data set;
wherein the generating a target knowledge sample data set according to the first knowledge sample data set and the second knowledge sample data set comprises:
generating the target knowledge sample data set according to the first knowledge sample data set, the second knowledge sample data set, and the third knowledge sample data set.

12. The non-volatile computer storage medium according to claim 11, wherein the computer program, when executed, further implements:
for each source file, dividing the source text and generating a first candidate sentence text set;
performing a filtering process on the first candidate sentence text set and generating a second candidate sentence text set;
wherein the searching, in the source texts, m first texts that match the n SPO entries comprises:
for each source file, searching, in the second candidate sentence text set, a first text that matches the n SPO entries.

13. The non-volatile computer storage medium according to claim 12, wherein the computer program, when executed, further implements:
filtering first candidate sentence texts whose lengths satisfy a preset range in the first candidate sentence text set and generating the second candidate sentence text set.

14. The non-volatile computer storage medium according to claim 11, wherein the computer program, when executed, further implements:

performing a right-or-wrong check on each sample in the target knowledge sample data set, and deleting a wrong sample from the target knowledge sample data set.

15. The non-volatile computer storage medium according to claim 14, wherein the computer program, when executed, further implements:

converting each sample in the target knowledge sample data set into a preset format, and performing a right-or-wrong check on each sample in the target knowledge sample data set in the preset format, and deleting a wrong sample from the target knowledge sample data set.

\* \* \* \* \*